(12) United States Patent
Fullerton

(10) Patent No.: US 7,479,884 B1
(45) Date of Patent: Jan. 20, 2009

(54) SYSTEM AND METHOD FOR MONITORING OBJECTS, PEOPLE, ANIMALS OR PLACES

(75) Inventor: Larry W. Fullerton, New Hope, AL (US)

(73) Assignee: Cedar Ridge Research, Huntsville, AL (US)

( * ) Notice: Subject to any disclaimer, the term of this patent is extended or adjusted under 35 U.S.C. 154(b) by 199 days.

(21) Appl. No.: 11/215,490

(22) Filed: Aug. 30, 2005

Related U.S. Application Data

(60) Provisional application No. 60/605,720, filed on Aug. 31, 2004.

(51) Int. Cl.
*G08B 13/14* (2006.01)

(52) U.S. Cl. ............. 340/572.7; 340/573.1; 340/572.1; 342/51; 342/43; 342/44

(58) Field of Classification Search ... 340/572.1–572.9, 340/10.1; 342/51, 42, 44, 43, 109, 113, 118, 342/125, 128, 146
See application file for complete search history.

(56) References Cited

U.S. PATENT DOCUMENTS

| | | | | |
|---|---|---|---|---|
| 4,196,418 A | * | 4/1980 | Kip et al. ................. | 340/10.34 |
| 4,786,907 A | * | 11/1988 | Koelle ........................ | 342/51 |
| 4,860,216 A | * | 8/1989 | Linsenmayer ............... | 342/159 |
| 5,103,222 A | * | 4/1992 | Hogen Esch et al. ....... | 340/10.1 |
| 5,105,190 A | * | 4/1992 | Kip et al. ................. | 340/10.34 |
| 5,977,913 A | * | 11/1999 | Christ ........................ | 342/465 |
| 6,046,683 A | * | 4/2000 | Pidwerbetsky et al. ..... | 340/10.4 |
| 6,621,467 B1 | * | 9/2003 | Marsh ........................ | 343/850 |
| 6,657,580 B1 | * | 12/2003 | Edwards et al. ............... | 342/51 |
| 6,870,460 B2 | * | 3/2005 | Turner et al. ................ | 340/10.1 |
| 6,995,652 B2 | * | 2/2006 | Carrender et al. .......... | 340/5.61 |
| 7,009,517 B2 | * | 3/2006 | Wood ....................... | 340/572.1 |
| 7,026,939 B2 | * | 4/2006 | Letkomiller et al. ..... | 340/572.7 |
| 7,030,761 B2 | * | 4/2006 | Bridgelall et al. ......... | 340/572.2 |
| 7,196,654 B2 | * | 3/2007 | Edwards et al. ............... | 342/43 |
| 2002/0113709 A1 | * | 8/2002 | Helms ...................... | 340/572.7 |
| 2002/0128052 A1 | * | 9/2002 | Neagley et al. ............. | 455/575 |
| 2002/0140546 A1 | * | 10/2002 | Tuttle ........................ | 340/10.1 |
| 2003/0184440 A1 | * | 10/2003 | Ballantyne ............... | 340/568.5 |
| 2007/0075831 A1 | * | 4/2007 | Grego ....................... | 340/10.1 |

* cited by examiner

*Primary Examiner*—George A Bugg
*Assistant Examiner*—Hoi C Lau
(74) *Attorney, Agent, or Firm*—Venable LLP; Robert S. Babayi

(57) ABSTRACT

An improved system and method for monitoring objects, people, animals, or places uses a passive Modulating Reflector (MR) tag where an antenna is alternately short and open circuited according to a time-varying pattern by a modulating network thereby causing the reflective characteristics of the antenna to vary in accordance with the time-varying pattern. When an interrogator transmits an RF waveform that impinges on the antenna, the return signal reflecting off the antenna is modulated in accordance with the time-varying pattern allowing a remote receiver to demodulate information from the modulated return signal. The MR tag can be used with a wide variety of tag-interrogator configurations employing monostatic and/or bistatic radar techniques to allow monitoring, locating, and/or tracking of objects, people, animals, or place with which MR tags are associated.

17 Claims, 13 Drawing Sheets

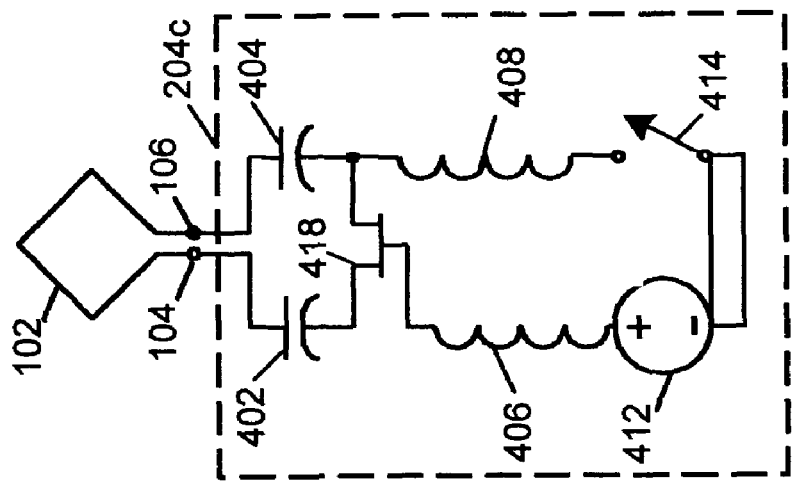
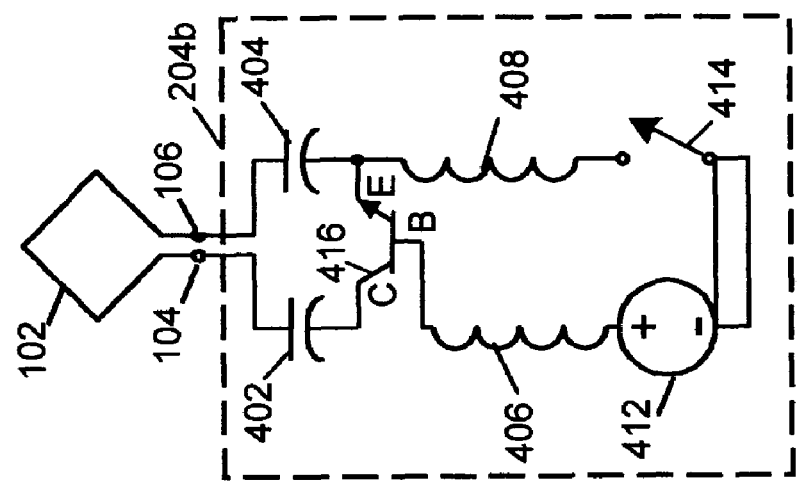
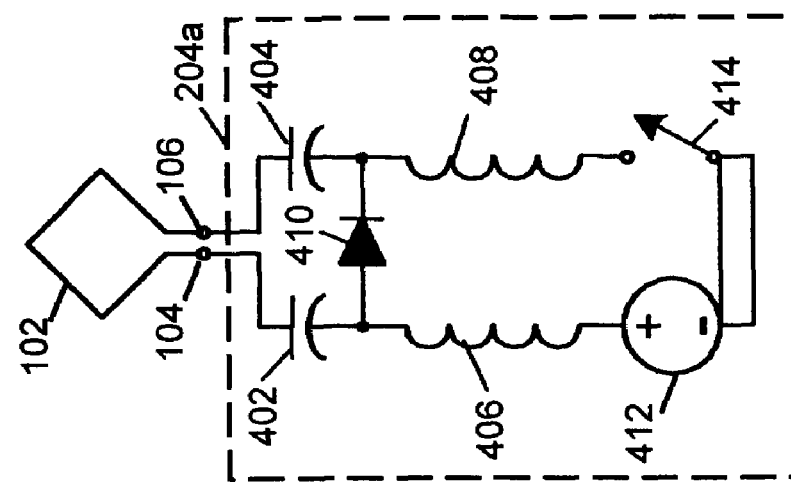

SYSTEM AND METHOD FOR MONITORING OBJECTS, PEOPLE, ANIMALS OR PLACES

CROSS-REFERENCE TO RELATED APPLICATIONS

This application claims the benefit of U.S. Provisional Application Ser. No. 60/605,720, filed Aug. 31, 2004.

FIELD OF THE INVENTION

The present invention relates generally to a system and method for monitoring objects, people, animals, or places. More particularly, the present invention relates to monitoring objects, people, animals, or places using tags and an interrogator.

BACKGROUND OF THE INVENTION

It is often desirable or necessary to monitor objects, people, animals or places, which may involve the monitoring of information about the objects, people, animals or places; locating the objects, people, animals or places; and/or tracking the objects, people, animals, or places. One approach for monitoring, for example, an object involves associating an active tag with the object. An active tag transmits an RF signal that can be received by a suitable receiver, which can demodulate the signal to determine the tag's identification and be used to locate the tag. Active tags can be transmit-only devices or can be transceivers capable of transmitting and receiving. Transmit-only tags can transmit continuously or periodically (e.g., for 1 second every 10 seconds). Such tags may stay in a powered down 'sleep' mode until interrogated in which case they 'power up' and begin transmitting. Transmit-only tags can be associated with a sensor or some other device and transmit only when a condition is met (e.g., smoke is detected). Transceiver-type tags may continuously or periodically (e.g., for 1 second every 10 seconds) 'listen' for a 'tag request' signal, which can be received and demodulated, and if the received signal has the appropriate data (e.g., the identifier for a particular tag or tags), then one or more of the tags may respond.

Another approach for monitoring an object, for example, involves associating an inductive RFID tag with the object. With this approach an interrogator uses a loop of wire to inductively communicate with and possibly power the inductive tag by modulating the loading of the loop with a modulation signal.

A passive approach for monitoring an object, for example, involves associating a RF backscatter tag with the object. An RF backscatter tag consists of a resonant antenna having a resistive load placed across its terminals that is varied to impose an Amplitude Modulated (AM) envelope onto its reflection characteristics, thereby conveying a signal back to an interrogator via the modulated reflection. The receive antenna is usually connected to a rectifier that converts the RF received from the interrogator to DC to power the circuit. These passive tags typically operate in the microwave spectrum. Existing passive tags, however, have limited signal-to-noise (SNR) and thus require the interrogator to be within close range of the tag and/or operate at a low data rate. As such, a system and method is needed that significantly increases the signal-to-noise (SNR) of passive tags in order to allow tracking and locating at much greater ranges and much higher data rates.

SUMMARY OF THE INVENTION

The present invention is an improved system and method for monitoring objects, people, animals, or places using a passive Modulating Reflector (MR) tag. In one embodiment, any one or any combination of the impedance, delay, phase, polarization or attenuation characteristics of an antenna are modified in accordance with a time-varying pattern such that when an interrogator's RF waveform impinges on the antenna, the return signal reflecting off the antenna is likewise modulated as a result of the modification of the antenna characteristics. The information contained in this signal can then be demodulated by a remote receiver, typically contained within the interrogator.

In another embodiment the tag is powered by a self-contained battery or other local energy source.

In a further embodiment, Direct Sequence Spread Spectrum (DSSS) techniques are applied to channelize the tags and give them some immunity to RF noise sources in the same band, including other interrogators and tags. In a preferred embodiment, the DSSS modulation is imposed on the interrogation waveform by the interrogator.

In yet another embodiment, the MR tag's antenna structure is incorporated into a retro reflector.

In still another embodiment, the MR tag's antenna structure is constructed as a phased array allowing the reflective direction of the antenna structure to be programmable by varying and controlling the delays or phase shifts of the antenna elements

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1C:
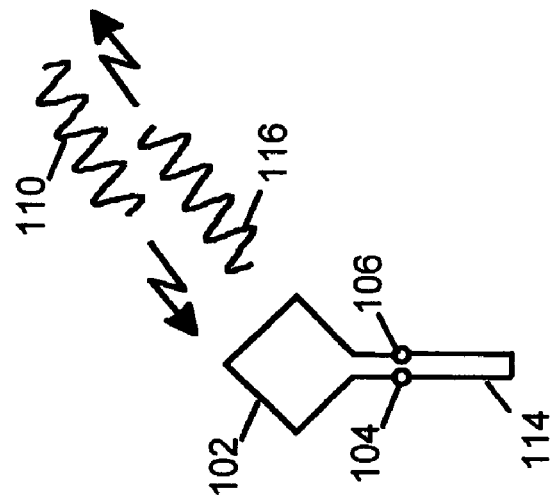
Figure 1B:
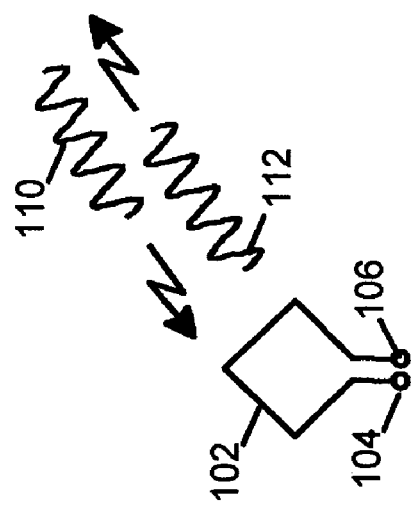
Figure 1A:
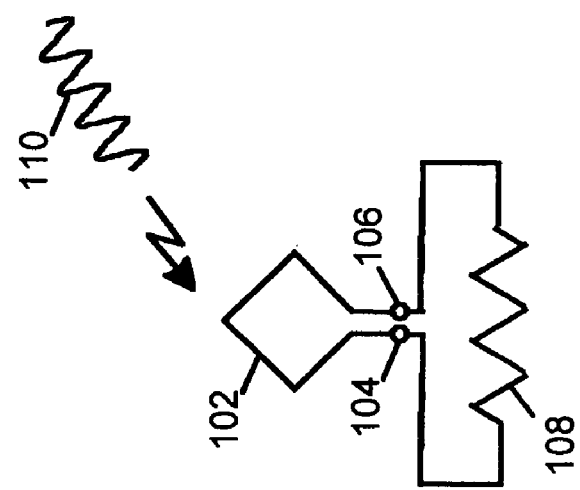
Figure 2:
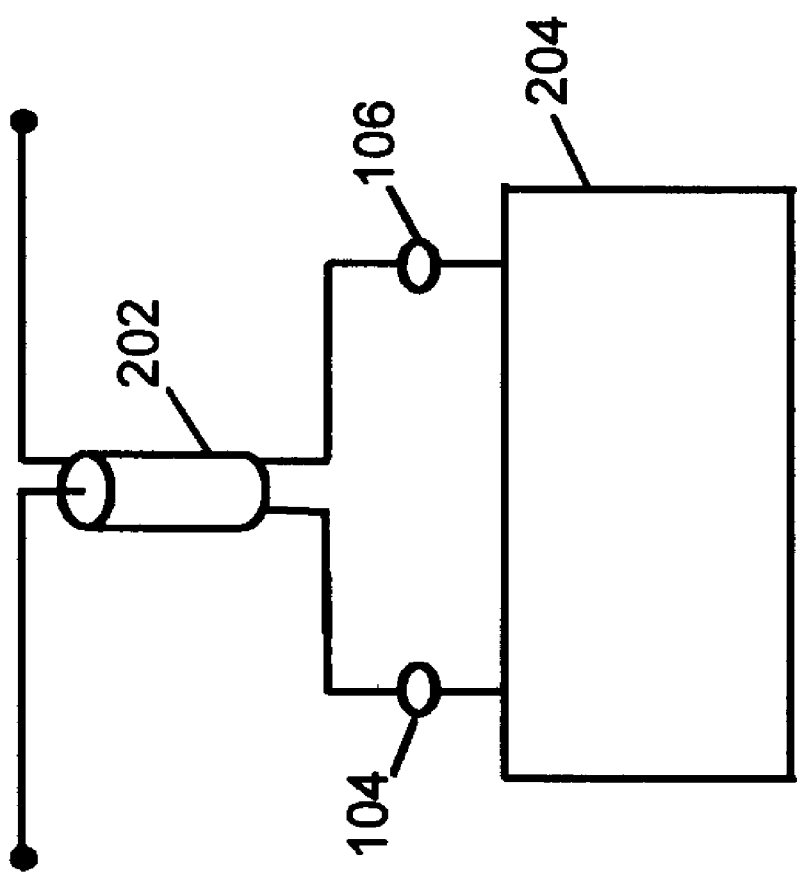
Figure 3B:
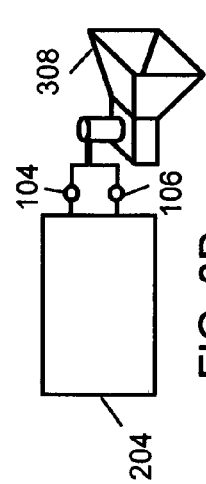
Figure 3D:
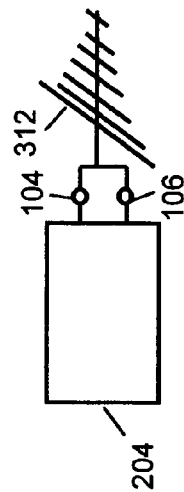
Figure 3F:
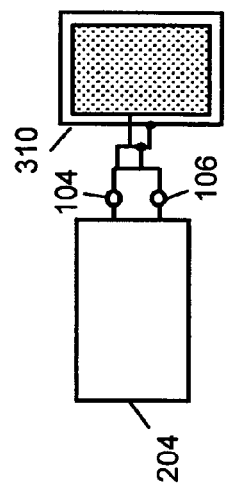
Figure 3A:
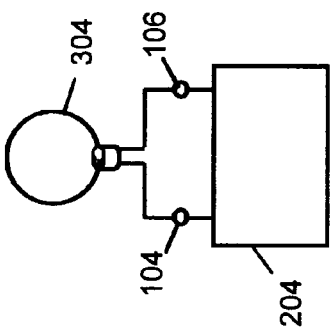
Figure 3C:
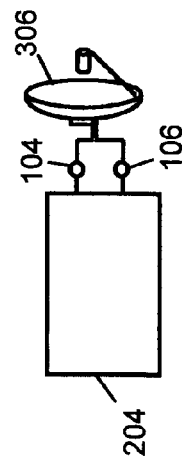
Figure 3E:
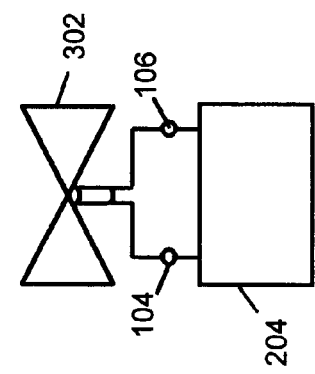
Figure 5:
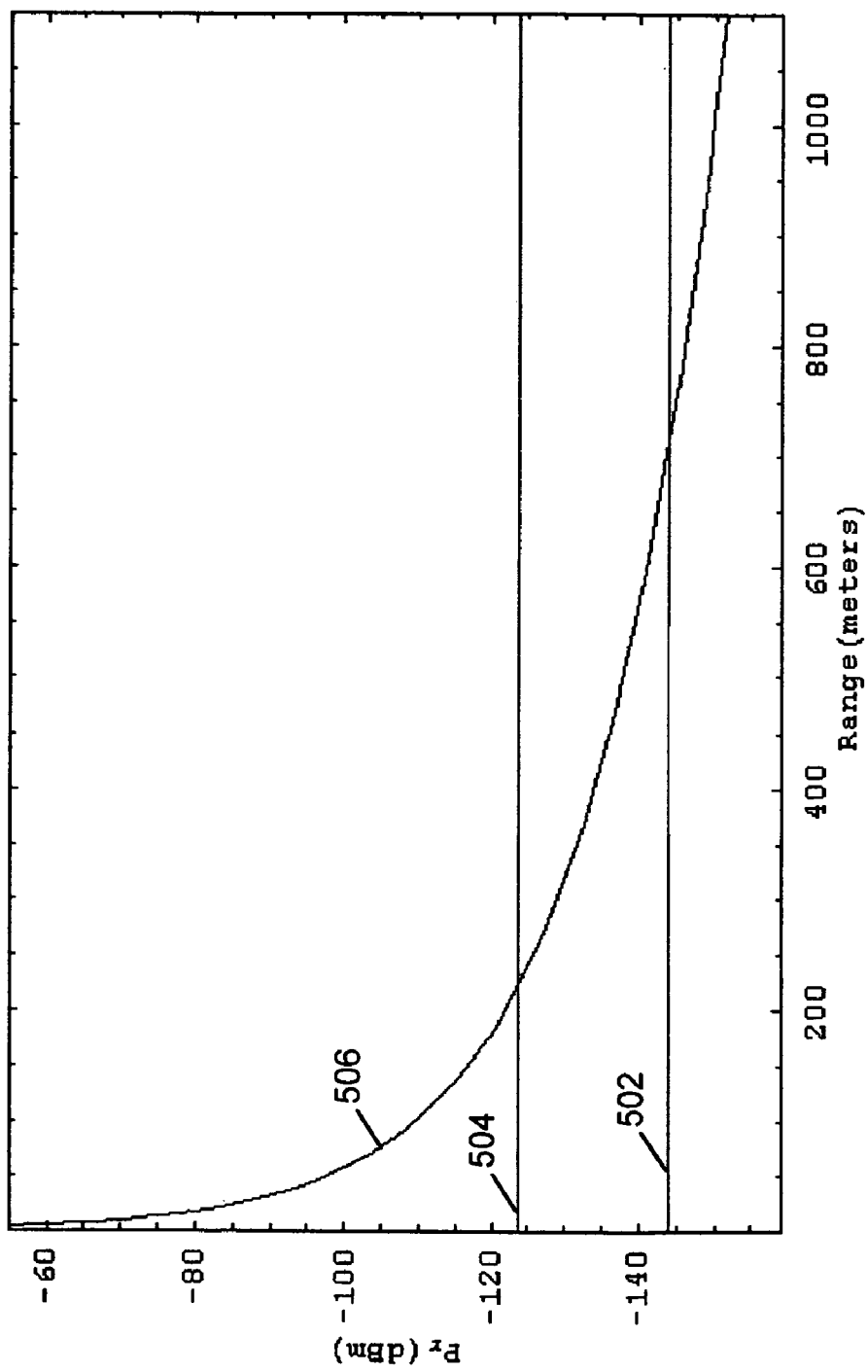
Figure 6:
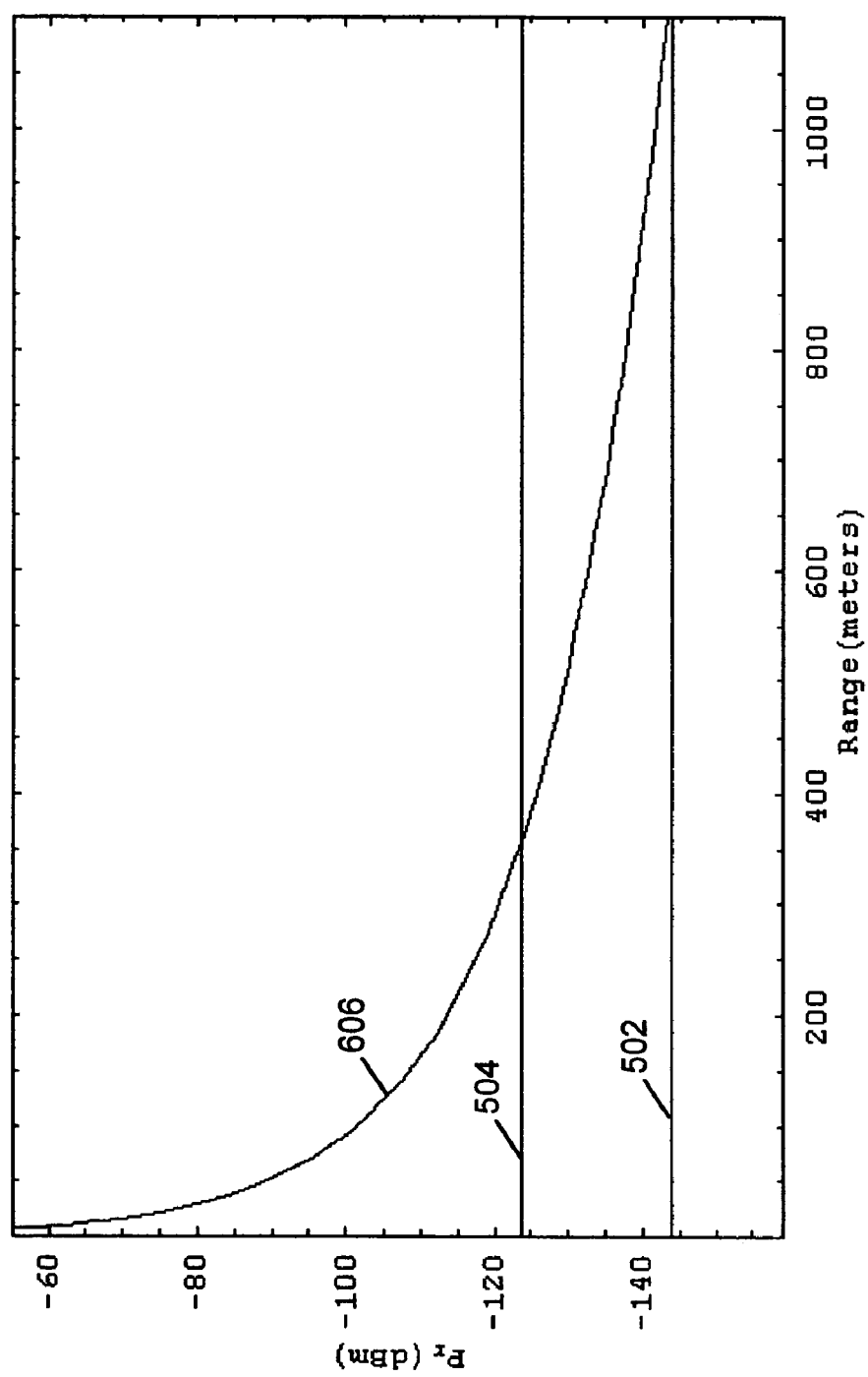
Figure 7:
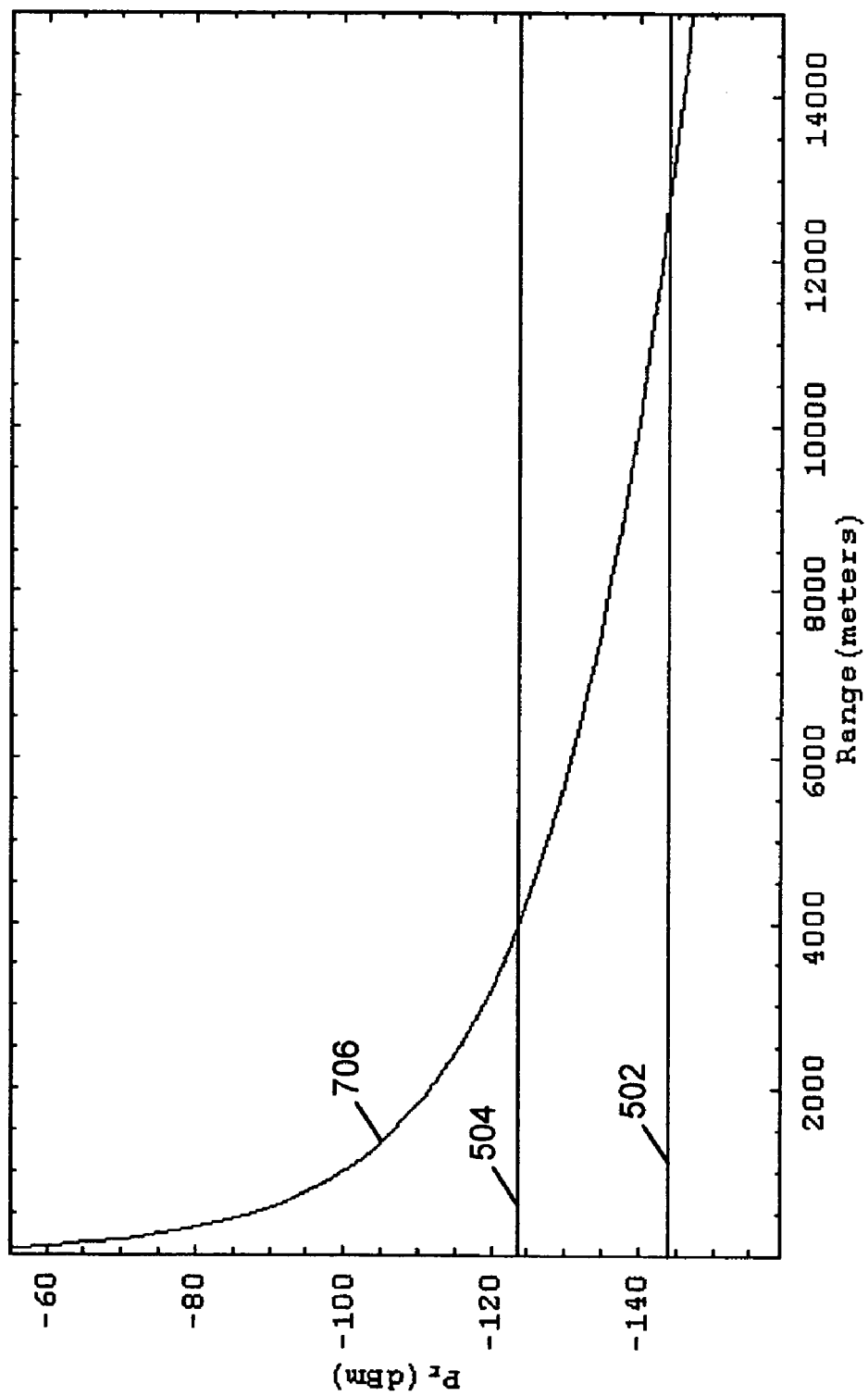
Figure 8:
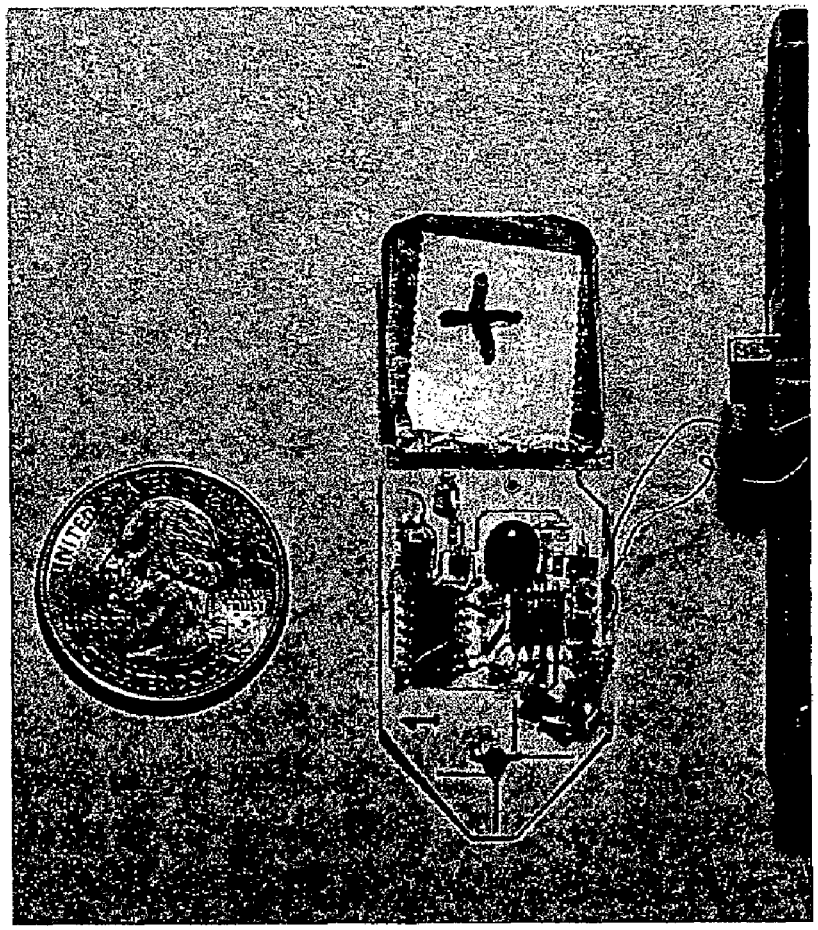
Figure 9:
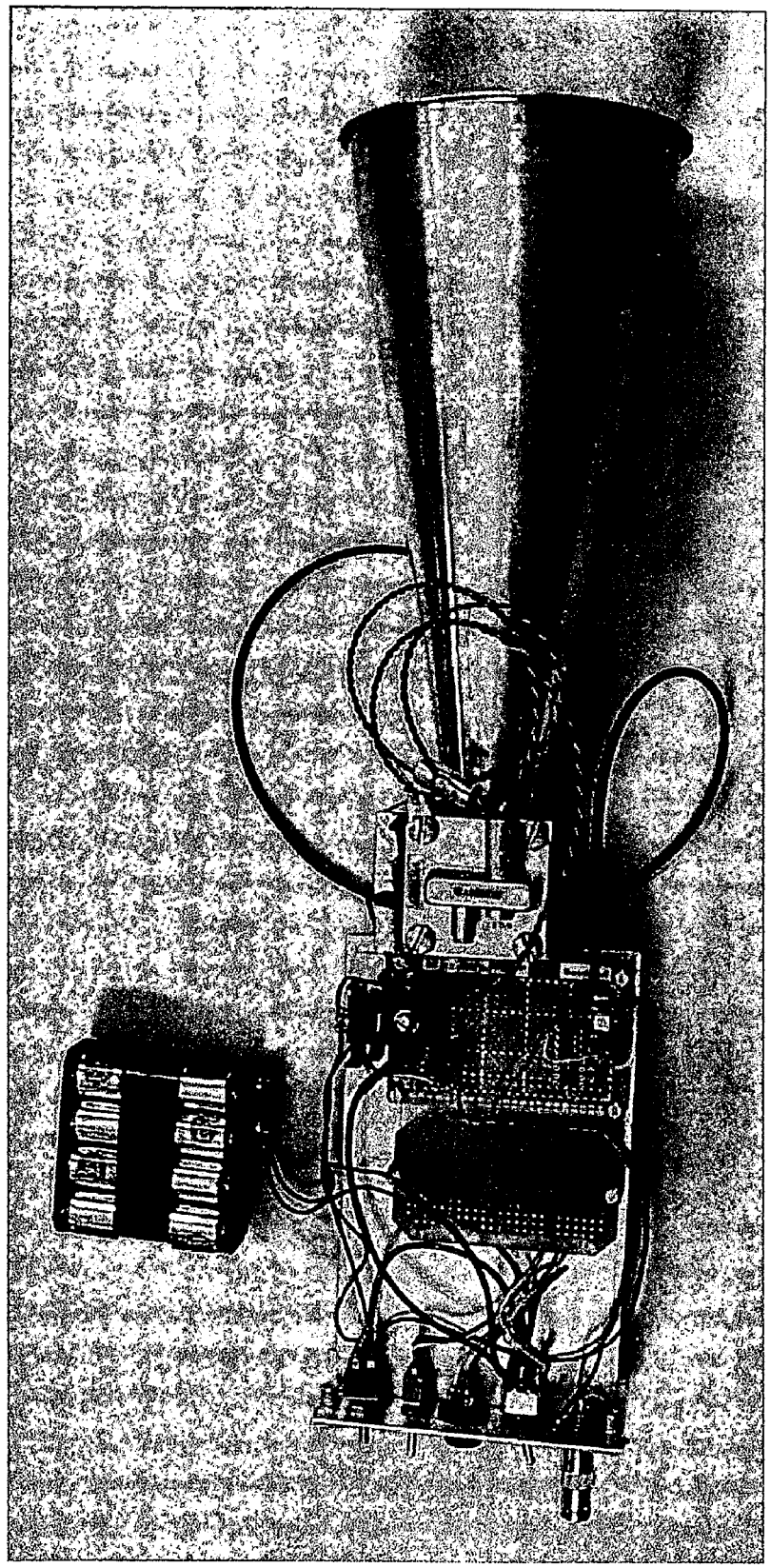

FIG. 1A illustrates a receive antenna having an impedance matched load absorbing an incoming RF wave;

FIG. 1B illustrates an incoming RF wave reflecting off a receive antenna having an open circuit thereby resulting a reflected RF wave having a first polarity;

FIG. 1C illustrates an incoming RF wave reflecting off a receive antenna having a shorted circuit thereby resulting a reflected RF wave having a second polarity;

FIG. 2 illustrates an exemplary modulating reflector of the present invention where an antenna is connected to a block symbolizing a modulating network;

FIG. 3A illustrates an embodiment of the invention incorporating a bowtie antenna;

FIG. 3B illustrates an embodiment of the invention incorporating a loop antenna;

FIG. 3C illustrates an embodiment of the invention incorporating a dish antenna;

FIG. 3D illustrates an embodiment of the invention incorporating a horn antenna, FIG. 3E illustrates an embodiment of the invention incorporating a printed antenna;

FIG. 3F illustrates an embodiment of the invention incorporating a 7-element Yagi antenna;

FIG. 4A illustrates an embodiment of a modulating network of the invention incorporating a diode switched short;

FIG. 4B illustrates an embodiment of a modulating network of the invention incorporating a bipolar transistor switched short;

FIG. 4C illustrates an embodiment of a modulating network of the invention incorporating a field effect transistor switched short;

FIG. 5 illustrates the signal expected to be received by an interrogator using 100 mW of effective power that is located at various ranges from a tag having 3 dB gain;

FIG. 6 illustrates the signal expected to be received by an interrogator using 100 mW of effective power that is located at various ranges from a tag having 20 dB gain;

FIG. 7 illustrates the signal expected to be received by an interrogator using 10 KW of effective power that is located at various ranges from a tag having 3 dB gain;

FIG. 8 depicts an operational prototype of a semi-passive RF tag of the present invention constructed by the inventor; and FIG. 9 depicts an operational prototype of an interrogator of the present invention constructed by the inventor.

Figure 10A:
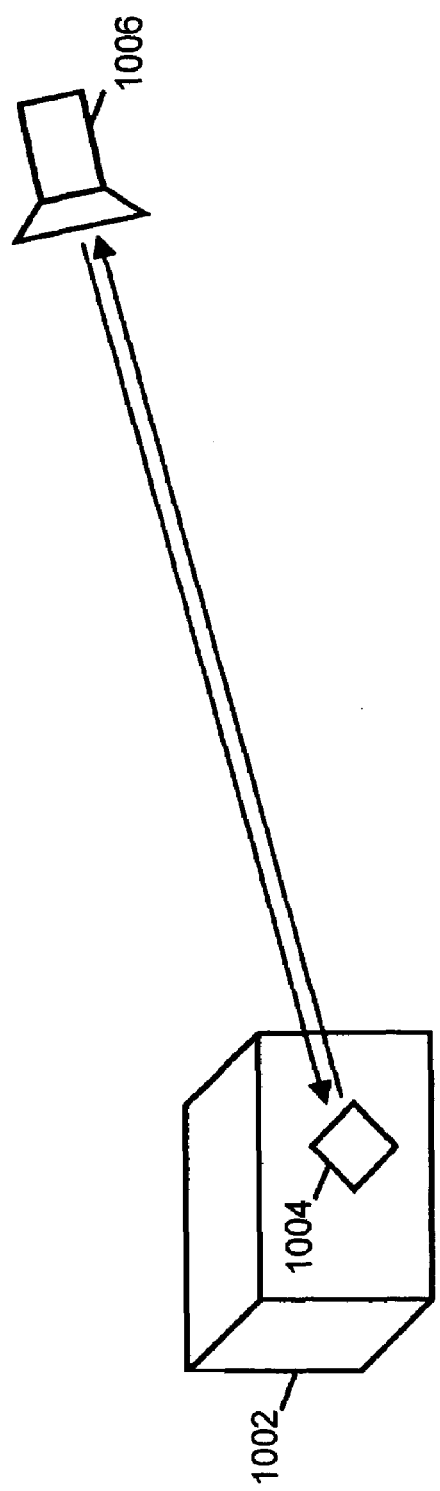

FIG. 10A depicts a first exemplary tag-interrogator architecture.

Figure 10B:
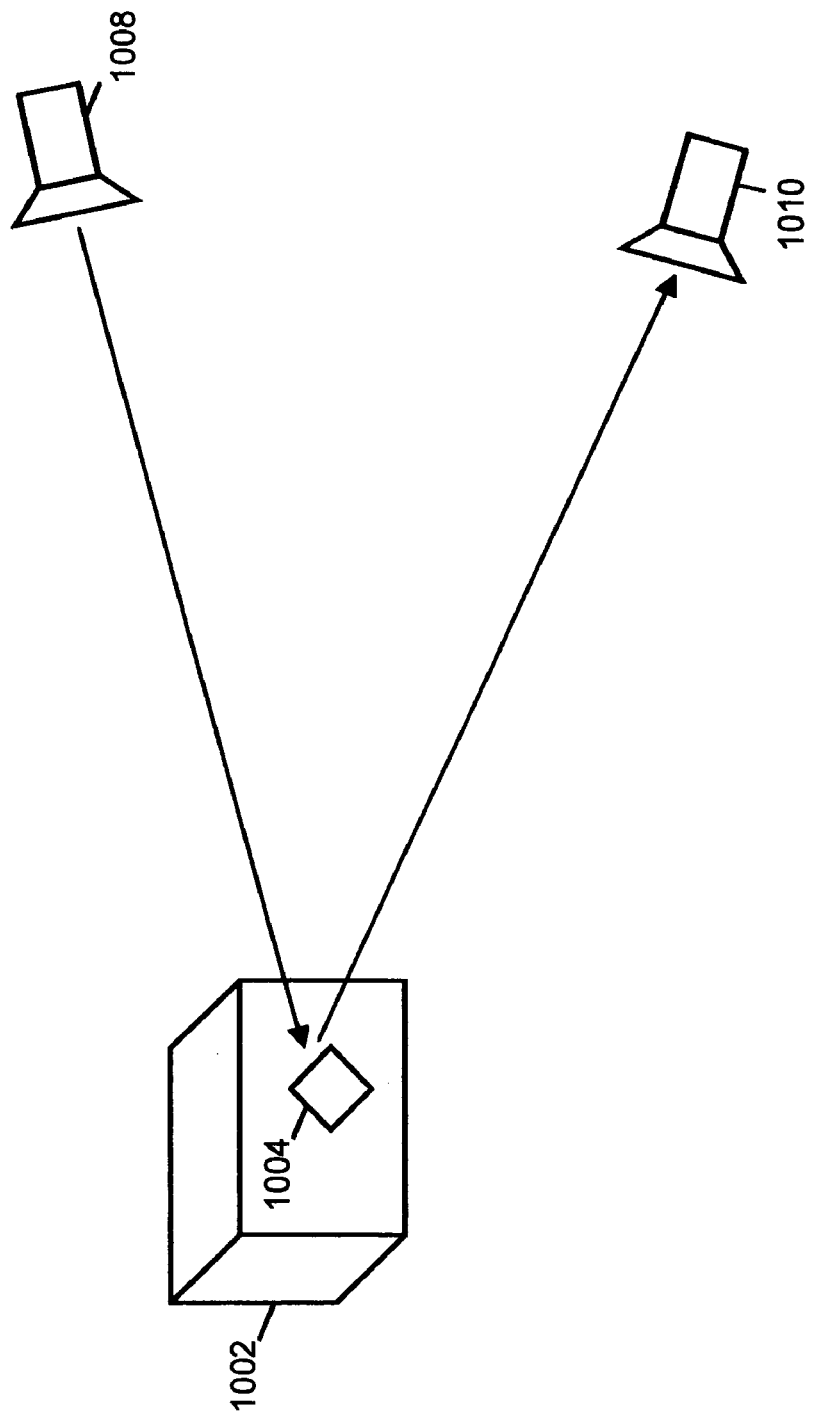

FIG. 10B depicts a second exemplary tag-interrogator architecture.

Figure 10C:
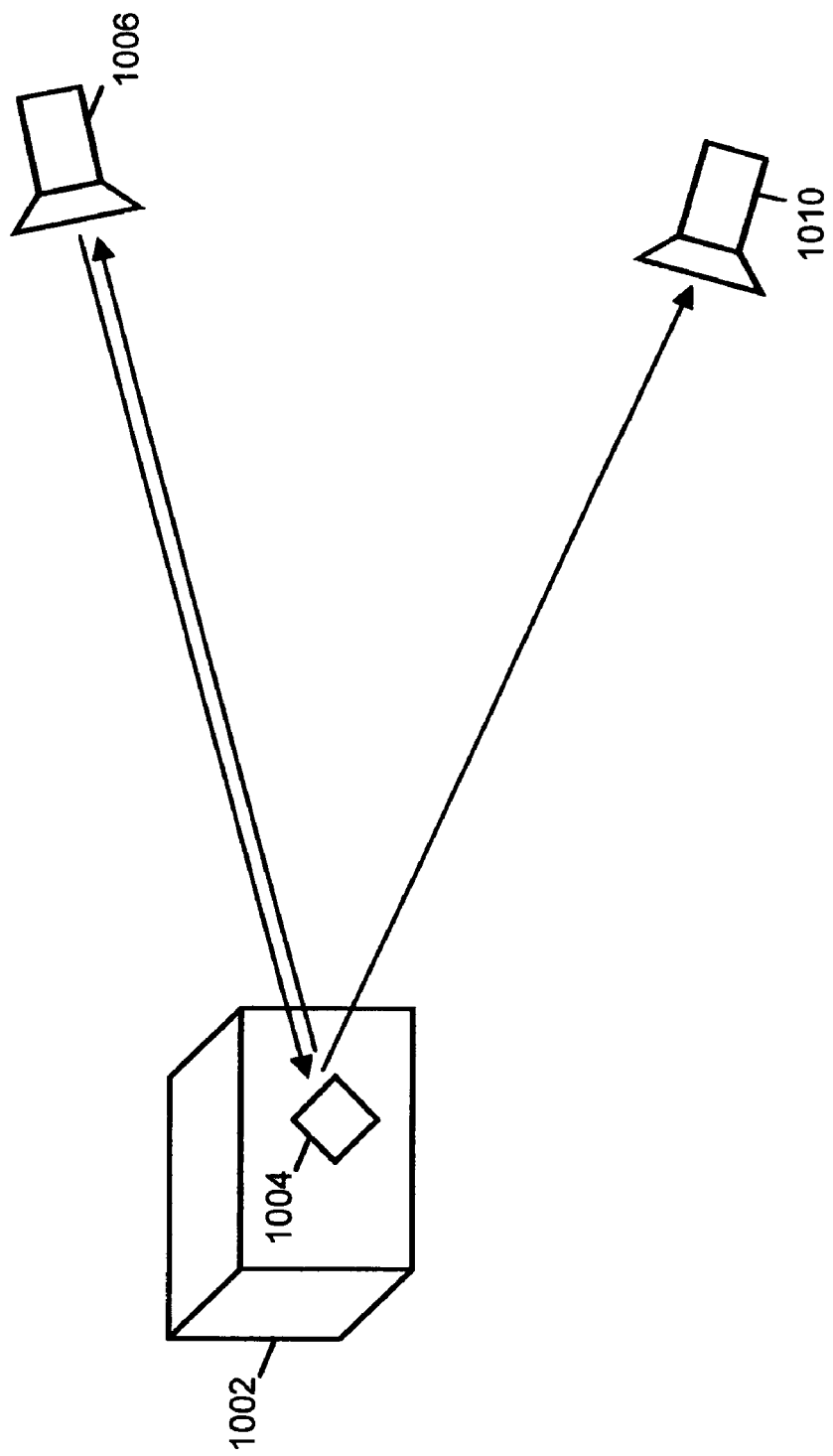

FIG. 10C depicts a third exemplary tag-interrogator architecture.

Figure 10D:
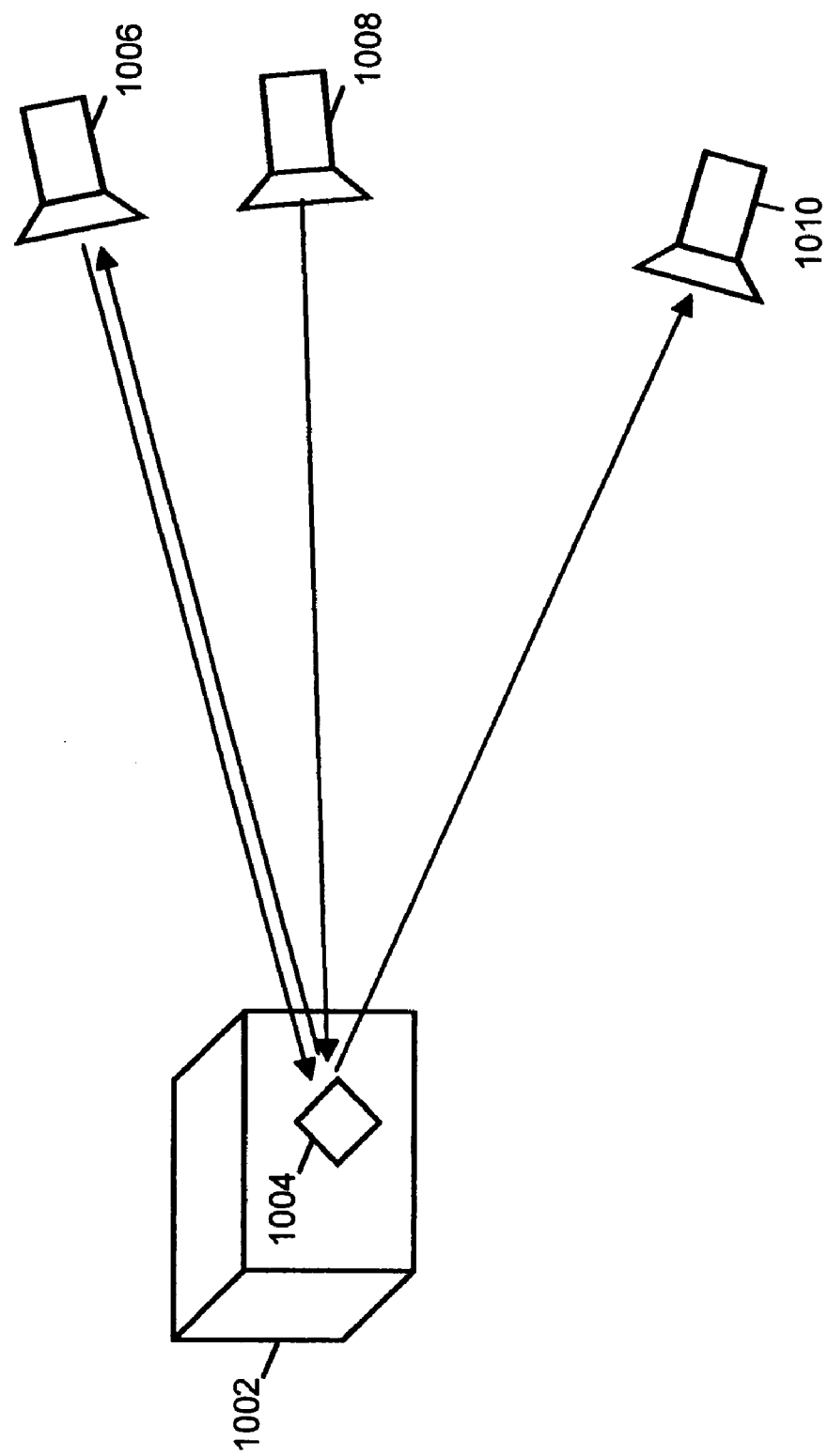

FIG. 10D depicts a fourth exemplary tag-interrogator architecture.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Antennas are electromagnetic structures that are used for transmitting and receiving electromagnetic radiation. When a current having an appropriate frequency is applied to the terminals of an antenna structure, it is caused to convert some of the power applied to the terminals into electromagnetic radiation that is then radiated, or transmitted, by the antenna structure into space. Conversely, when electromagnetic radiation having appropriate frequency and polarity encounter an antenna structure, electromagnetic radiation can be absorbed, or received, by the antenna structure and converted into a current that appears at the terminals. However, depending on how the antenna structure is terminated, some of the electromagnetic radiation can be reflected back to the antenna and reemitted into space.

FIGS. 1A-1C illustrate different absorption and reflection characteristics of an antenna resulting from a difference in how it is terminated. FIG. 1A shows antenna structure 102 having terminals 104, 106 across which a 'characteristic' (or matched) impedance 108 is applied. When an antenna is terminated by a load matching the impedance of the terminals, most of the electromagnetic energy 110 encountering the antenna structure will be absorbed by that load and very little energy will be reflected back to the antenna structure for reemission. The antenna effectively absorbs the incoming wave. However, when a load is applied to the terminals of a receive antenna that does not match the characteristic impedance of the antenna terminals then some of the energy will be reflected back to the antenna structure. When such a current is reflected back to the antenna some of that current will be converted to electromagnetic energy and will be radiated back (or reemitted) into space. Note that the impedance that matches the impedance of a well designed antenna structure operating within its nominal frequency range is essentially a pure resistive impedance and accordingly is illustrated that way in FIG. 1A for clarity. In some cases contemplated by the inventor, however, an antenna may be either undersized or oversized relative to its resonant wavelength. An undersized antenna will be capacitive and will need a resistor-capacitor network to match it. Whereas, an oversized antenna will be inductive and require a resistor-inductor network for a match.

FIG. 1B depicts antenna structure 102 having terminals 104, 106 that are open circuited. If the terminals of the antenna are open circuited, some of encountered electromagnetic energy 110 is reflected back to the antenna structure and return signal 112 is emitted having the same frequency and polarity as the encountered electromagnetic energy 110.

FIG. 1C depicts antenna structure 102 having terminals 104, 106 that are short circuited by short circuit 114. If the terminals of the antenna are short circuited, some of encountered electromagnetic energy 110 is reflected back to the antenna structure and inverted return signal 116 is emitted having the same frequency and opposite polarity as the encountered electromagnetic energy 110.

The inventor recognized that if a remote transceiver (i.e., transmitter/receiver) radiates waves toward an antenna that is being alternately short and open circuited in accordance with a pattern then the remote transceiver will receive waves radiating back from the structure that are alternately of one phase and 180° phase shifted, or inverted in polarity, in accordance with the same pattern. As such, the terminals of an antenna structure can be short and open circuited as a form of Phase Shift Keying modulation in order to convey data from the antenna structure back to the remote transceiver. This modulating reflector approach to conveying data is done without the antenna structure receiving or transmitting in the usual sense and therefore conventional transmit and receive circuitry is not required. As such, a very low power, semi-passive MR can be produced from an antenna structure and what little circuitry is required to short and open it in accordance with a pattern known by the transceiver (or interrogator).

Various other novel methods can be used by the present invention to modulate an incoming signal before re-emitting it. In accordance with the invention, the MR tag can modulate an incoming signal by varying any one or a combination of the amplitude, phase angle, polarization angle, time delay, polarity, and direction of the reflected (re-emitted) signal. Modulation of the incoming wave via any of these modes may be either linearly or discretely varied before returning the RF energy back to the MR tag's antenna structure. For example, the phase angle of the incoming wave can be modulated by either continuous or by discrete values from 0° to 360° of rotation before returning it to the MR tag's antenna.

One exemplary modulation mode utilized by the MR tag is conventionally called Binary Phase Shift Keying (BPSK). In one embodiment involving BPSK modulation, a carrier's phase is modulated only by the values ±90° and the sequence of the phase shifts is made according to a suitable coded pattern, e.g. maximal length sequence codes generated by a feedback shift register.

There are many types and lengths of CDMA codes that may be used by the tag. An exemplary example would be a Gold code which is a combination of two pseudo random codes, one longer than the other which permits rapid lock with a poor signal-to-noise level, but then quickly allows locking to the longer sequence that achieves optimal performance. Codes may be selected based upon their correlation properties (i.e., autocorrelation and/or cross-correlation) and/or spectral properties.

It is further anticipated that many otherwise conventional modulation methods may be utilized by the MR tag and the description of the modulation examples above is not intended to limit it to these methods. Some of these modulation methods that may be utilized either alone or in combination with the others include: Frequency Modulation (FM), Amplitude Modulation (AM), Phase Shift Keying (PSK), Quadrature Phase Shift Keying (QPSK), Higher orders of PSK, Trellis, and Pulse Amplitude Modulation (PAM).

It is often desirable to field a plurality of tags so as to track and locate a plurality of objects. As such Direct Sequence Spread Spectrum (DSSS) coding techniques can be used with the MR tags to provide channelization and to give them some immunity to RF noise sources in the same band, including other interrogators and MR tags.

In a preferred embodiment, the additional DSSS modulation uses a modulation rate such that its resulting modulation (i.e., information and code) bandwidth would be greater than the bandwidth required by the information alone. According to the theory of spread spectrum, narrow band interference within the occupied RF band can then be reduced by approximately the ratio of the DSSS bandwidth to the information bandwidth.

DSSS modulation can be imposed on the interrogation waveform by the MR tag or by the interrogator. The use of DSSS modulation on the interrogation waveform would be primarily to channelize it with respect to waveforms produced by other interrogators within reception range that have the potential to cause mutual interference. Another purpose would be to reduce its "signature" to hostile receivers in applications in which it is desirable that the interrogator be as innocuous as possible, such as in a warfare or law enforcement environment.

FIG. 2 illustrates an exemplary modulating reflector of the present invention where an antenna 202 is connected to a block symbolizing a modulating network where the modulating network would include appropriate circuitry required to implement one or more of the various modulating methods described above.

FIGS. 3A-3F illustrate different embodiments of antennas that can be used with the present invention. In FIG. 3A, modulating network 204 is connected across terminals 104, 106 to bowtie antenna 302. In FIG. 3B, modulating network 204 is connected across terminals 104, 106 to loop antenna 304. In FIG. 3C, modulating network 204 is connected across terminals 104, 106 to dish antenna 306. In FIG. 3D, modulating network 204 is connected across terminals 104, 106 to horn antenna 308. In FIG. 3E, modulating network 204 is connected across terminals 104, 106 to printed antenna 310. In FIG. 3F, modulating network 204 is connected across terminals 104, 106 to 7 element Yagi antenna 312. One of ordinary skill in the art will recognize that a multitude of antenna types, each with its own antenna characteristics, can be employed in accordance with the present invention so as to achieve appropriate performance given operational conditions for which the antennas are intended.

FIGS. 4A-4C illustrate three embodiments of a modulating network whereby a active element is used to short circuit/open circuit modulate an exemplary loop antenna. The three active elements shown in FIGS. 4A-4C are a diode, a bipolar transistor, and a field effect transistor, respectively. In each case the active component is caused to be either high or low impedance depending on the bias current supplied to it. The inductors and capacitors are used to isolate the modulating circuit from the RF circuit. The capacitors are chosen to have low impedance with respect to the RF frequencies and high impedance to the modulating frequencies. Conversely, the inductors are chosen to present high impedance to the RF frequencies and low impedance to the modulating frequencies.

In FIG. 4A, antenna 102 having terminals 104, 106 is connected to modulating network 204a. Specifically, terminal 104 is connected to capacitor 402 and terminal 106 is connected to capacitor 404. Capacitors 402 and 404 are connected in series with inductors 406 and 408, respectively. Diode 410 is connected at the junction between capacitor 402 and inductor 406 and at the junction between capacitor 404 and inductor 408. Inductor 406 is connected to power source 412 which is in turn connected to one side of switch 414. Inductor 408 is connected to the other side of switch 414. As such, switch 414 can be used to open and short circuit antenna 102.

In FIG. 4B, antenna 102 having terminals 104, 106 is connected to modulating network 204b. Specifically, terminal 104 is connected to capacitor 402 and terminal 106 is connected to capacitor 404. Capacitor 402 is connected to the collector of bipolar transistor 416. Capacitor 404 is connected in series with inductor 408. The emitter of bipolar transistor 416 is connected to the junction between capacitor 404 and inductor 408 and the base of bipolar transistor 416 is connected to inductor 406. Inductor 406 is connected to power source 412 which is in turn connected to one side of switch 414. Inductor 408 is connected to the other side of switch 414. As such, switch 414 can be used to open and short circuit antenna 102.

In FIG. 4C, antenna 102 having terminals 104, 106 is connected to modulating network 204c. Specifically, terminal 104 is connected to capacitor 402 and terminal 106 is connected to capacitor 404. Capacitor 402 is connected to the source of field effect transistor 418. Capacitor 404 is connected in series with inductor 408. The drain of field effect transistor 418 is connected to the junction between capacitor 404 and inductor 408 and the gate of field effect transistor 418 is connected to inductor 406. Inductor 406 is connected to power source 412 which is in turn connected to one side of switch 414. Inductor 408 is connected to the other side of switch 414. As such, switch 414 can be used to open and short circuit antenna 102.

The power source 412 of FIGS. 4A-4C can be a self-contained battery or a local energy source.

If the power source and switch in FIGS. 4A-4C are replaced by a variable current then the loading on the antenna can be linearly varied from short circuit to open circuit, thereby giving it the ability to vary the reemitted wave through all values from 0° to 18° of phase shift. This gives the modulator the ability to perform higher orders of modulation including FM, AM, BPSK and PAM.

If the diode of FIG. 4A is replaced by a phase shift or delay network consisting of inductors, capacitors and possibly resistors, then the phase and/or amplitude of the received RF may be modified before returning it to the antenna for reemission. If one or more of these elements are variable at a rate high enough to support data modulation, then such a network will support the modes of modulation that include n-ary coding, generalized PSK, QPSK and trellis. The delay or phase shift may also be accomplished through the use of discrete delay elements such as strip lines, coaxial cable or other conventional delay means. The networks that may be used to accomplish this delay or phase shift are generally known in the art. Examples include variactors in reactive networks and PIN diode switched discrete delay lines.

In order to improve the gain or radar cross section (RCS) of the MR tag with respect to the interrogator, the tag's antenna structure may be incorporated into a retro reflector. Retro reflectors are generally known in the RADAR art and are used to increase the amount of reflected energy that is returned to a RADAR from a target in a manner that is generally independent of the angle between the RADAR and the retro reflector. It operates to return incoming waves directly back to the RADAR regardless of this angle, and thereby presents a high RCS target. When a MR tag's antenna structure is incorporated into such a retro reflector, the effective range and/or data rate at a given range can be substantially increased. In the simplest embodiment the MR tag's antenna structure may be centered within a standard corner reflector, or trihedral, so that it modifies the wave both as it enters and as it leaves. This simple method has the drawback however of inducing a destructive interference at some angles that would have otherwise been within the capability of the retro reflector to return RF energy to the interrogator. In the invention it is disclosed that improved angular capability can be achieved by placing the MR tag's antenna (or antennas) on one or more faces of a corner reflector. In this way there is no potential for destructive interference between the incoming and outgoing wave which allows the retro reflectors full angular capability to be utilized.

Similarly, other generally known retro reflector structures may be utilized, such as the Luneberg Lens. It is also the intent of this invention to utilize artificial negative refractive index materials to synthesize an essentially flat retro reflector/modulating antenna structure. A summary of these materials can be found in the Aug. 6, 2004 issue of Nature on page 788.

"Reflected Direction" may be accomplished by constructing the MR tag's antenna structure as a phased array. Each individual element of the array would have the ability to delay or phase shift the incoming RF before returning it to its own element. When these delays or phase shifts are properly set according to the array geometry then the outgoing wave can be programmed to emit in any desired direction with respect to the direction of the incoming wave. It acts as though it is a plane mirror situated at an angle with respect to the interrogator. If all the delays or phase shifts are zero or a multiple of $2\Pi$ of the incoming wave's frequency, then the array acts as a plane mirror positioned in exactly the plane of the antenna structure itself. Otherwise the physical array and the plane of reflection can be programmed by varying and controlling the delays or phase shifts of the antenna elements in which case the effective reflection plane vs. the physical array angle will be in accordance with the programmed delays or phase shifts.

As an element of this invention, a programmable reflection direction can be used to sweep the reemitted RF in an area or solid angle to act in lieu of a retro reflector. By sweeping the angle of the reflection it will eventually reflect back to the interrogator regardless of the physical angle that exists between them, thereby giving the effect of a retro reflector but allowing a flat form factor rather than the larger volume required of a physical retro reflector such as a trihedral.

Various forms of interrogators can be used in accordance with the invention. Under one arrangement, a conventional monostatic x-band radar is used as an interrogator, for example, one like those used to detect the speed of vehicles or baseballs. With a monostatic radar, the interrogation signal is transmitted from the same location that the return signal is received. FIG. 10A depicts an exemplary tag-interrogator architecture where an object 1002 has associated with it a MR tag 1004 that is interrogated by a transceiver 1006 functioning as a monostatic radar.

Under another arrangement, a bistatic radar configuration is employed where an interrogation signal is transmitted from one location and the return signal is received at another location. In this case, the receiver will lock on the transmitted signal in order to derive its local oscillator's frequency and phase to achieve coherency with the signal that is emitted from tags being interrogated. Coherency is desirable as it improves the range and signal-to-noise performance of the receiver. FIG. 10B presents an exemplary tag-interrogator architecture where an object 1002 has associated with it a MR tag 1004 that is interrogated by a transmitter 1008 and receiver 1010 functioning as a bistatic radar.

Various bistatic radar configurations can be used involving various combinations of one or more transmitters with one of more receivers. For example, a warehouse might be instrumented with several receivers at fixed locations and a transmitter at a fixed location, all of which are time synchronized. With the known locations, the synchronized transmitter and receivers can determine the position of the tag by processing the return signals using triangularization techniques. The configuration can be reversed, where multiple transmitters are used with a single receiver. And, various combinations can be employed using both multiple transmitters and multiple receivers. Furthermore, combinations of monostatic and bistatic radars can be used. For example, a plurality of transceivers could be employed where each acts as a monostatic radar and also collaborates with the other transceivers to act as bistatic radar. As such, the transceivers can fully exploit back-scattering (monostatic) and forward-scattering (bistatic) effects of the tag within a given environment. Generally, one with ordinary skill in the art will recognize that a variety of configurations of transmitters, receivers, and/or transceivers, synchronized and/or non-synchronized, can be used with various time-of-flight and/or differential time-of-arrival distance determination techniques as might be desirable for a given application of the invention. FIG. 10C depicts an exemplary tag-interrogator architecture where an object 1002 has associated with it a MR tag 1004 that is interrogated by a transceiver 1006 and a receiver 1010 where transceiver 1006 functions as monostatic radar and the transceiver 1006 and receiver 1010 together function as a bistatic radar. Similarly, FIG. 10D depicts an exemplary tag-interrogator architecture where an object 1002 has associated with it a MR tag 1004 that is interrogated by a transceiver 1006, transmitter 1008, and a receiver 1010 where transceiver 1006 functions as monostatic radar, transmitter 1008 and receiver 1010 function as a bistatic radar, transmitter 1008 and transceiver 1006 together function as a bistatic radar, and transceiver 1006 and receiver 1010 together function as a bistatic radar. Clearly, a large variety of architectures can be employed using different combinations of transceivers, transmitters, and receivers as required to best meet specific requirements.

In operation, the interrogator must determine the range to the tag. With one approach, it employs a range gate to isolate the return signals corresponding to a given range from those that may exist from other ranges that would otherwise provide interference. It sweeps a range gate through different time delays corresponding to different ranges at which the tag may be located. When the tag uses a CDMA code, then for each range gate swept, the interrogator must also search CDMA code phases. If the CDMA code used by the tag is among several possible codes, then the interrogator must search the CDMA code phases of the several possible codes for each range gate swept. In an alternative approach, the interrogator determines code lock before determining range.

Typically, the time width of the range gate is commensurate with the pulse width of the interrogating signal. For example if the interrogating signal is 10 ns wide then the range gates would also be 10 ns wide, giving a range resolution of 5 feet for tag range determination. However, the width of the range gate may be selected to be less than or greater than the pulse width of the interrogating signal to accommodate characteristics of the tag and/or characteristics of the RF environment that effect the characteristics of the return signal.

Finally, it is also possible to use ambient RF sources as tag interrogators. The receiver will again lock onto the frequency and phase of this ambient source to provide for coherent reception. Under one arrangement, a receiver may demodulate based upon the IF output of an existing radar.

In practice, multipath reflections improve the range performance of the interrogator-tag system. As such, when used in a high multipath environment, the interrogator's beamwidth can be broadened to include a swath of the reflecting environment rather than using a very narrow beamwidth.

The choice of operating frequency used by an interrogator will be a trade off of requirements of the operating environment and local regulatory requirements. Low frequency range of operation improves the penetration through walls and intervening objects that might be present in an office environment, for example, but increases the required size of the antenna and retro reflector. To accommodate a given operational environment, an interrogator can include any of or a combination of the following emissions:

Continuous wave, an unmodulated carrier that can be used to locate the tag in azimuth and retrieve its modulation but cannot determine its range, RF pulse, an enveloped carrier which can not only retrieve the modulation of the tag and determine its azimuth with respect to the interrogator but also its range Chirp, has performance similar to the RF pulse but accomplished by sweeping the carrier over a band of frequencies DSSS, or Direct Sequence Spread Spectrum also performs like the RF pulse but does so with a carrier whose phase is switched 180 degrees according to a code Phase coded carrier also performs like the RF pulse but does so with a carrier whose phase is modulated continuously Linear, circular or elliptical polarized carrier may be used to provide isolation between the interrogator's outgoing signal and the retro reflected signal from the tag, as the tag's reflection is at a different polarization angle that that of the carrier transmitted by the interrogator.

It is possible to use either a homodyne or a heterodyne receiver in the interrogator. A homodyne receiver has a relatively high noise figure, often exceeding 12 dB but it is very inexpensive to manufacture and works with very low battery power. A higher performance receiver can be made using a heterodyne receiver but it draws more power and is more expensive. Also, either method can be improved by the use of an in phase and a quadrature reception channel.

Under one arrangement, sequential or simultaneous discrete frequencies are used in conjunction with an FFT algorithm to reconstruct a high special resolution waveform in lieu of a chirp waveform. For example, 256 frequencies evenly spaced between 10 GHz to 11 GHz could be employed to achieve a 1 GHz bandwidth. With this approach, an IQ (both in-phase and quadrature) receiver detects the amplitude and phase of each reemitted frequency, puts them into a proper real and imaginary array, and uses an inverse FFT algorithm to return it to the time domain, thereby rendering a range estimate to the tag to a resolution of 6".

FIGS. 5-7 illustrate the signal expected to be received by an interrogator located at various ranges and using 1 mW to 10 KW of effective radiated power. The other parameters that define the plots are shown next to each plot. Dipole antennas were assumed for the tags and they were assumed to be ideally aligned with their polarization parallel to the interrogator's polarization. Each was also assumed to be placed inside a trihedral retro reflector whose size is indicated.

With FIGS. 5 and 6, an interrogator signal having a frequency of 10 GHz and transmit power of 100 mW is transmitted from a transmit antenna having 12 dB gain. Thermal noise limits 502, 504 are shown for 1 KHz and 100 KHz bandwidths, respectively. With FIG. 5, a tag having 3 dB gain uses a 3 cm diameter retroflector and with FIG. 6, a tag have 20 dB gain uses a 30 cm diameter retroflector. Curves 506 and 606 in FIGS. 5 and 6 provide a comparison of the received peak power in dBm versus range between the interrogator and a tag for the two retroflector sizes.

With FIG. 7, an interrogator signal having a frequency of 10 GHz and transmit power of 10 kW is transmitted from a transmit antenna having 12 dB gain. Thermal noise limits 502, 504 are shown for 1 KHz and 100 KHz bandwidths, respectively. With FIG. 7, a tag having 3 dB gain uses a 3 cm diameter retroflector. Curves 506 and 706 in FIGS. 5 and 7 provide a comparison of the received peak power in dBm versus range between the interrogator and a tag for the tow transmit power levels.

FIG. 8 and FIG. 9 depict operational prototypes constructed by the inventor. FIG. 8 shows a tag with its antenna to the left of the structure. The black dot in the center of the lines making up the antenna is a transistor used to modulate the load on the antenna. FIG. 9 shows a homodyne transceiver used to transmit and receive modulated RF back from the tag, and contains circuitry to demodulate the signal returned and use it to identify the tag by the information imposed on it by the tag's modulator and microprocessor. The tag is operated by a watch battery under the "+" sign and draws only 0.75 mA in continuous operation. This system operates at 10 GHz.

Various other techniques can be used in accordance with the invention to accommodate various operational environments. One skilled in the art will recognize that the use of one or more these techniques involves tradeoffs of cost, complexity, and performance. These techniques include:

Imposing polarization vector modulation on the interrogator's carrier to improve transmit/receive isolation and to determine the range of the tag while employing a single RF frequency carrier.

Using a reflector or dielectric lens to beam shape the retro reflected pattern of the MR to increase the positional angle over which significant RF power will be retro reflected back to the interrogator.

Using synthetic dielectrics for the retro reflector and/or beam former to improve the beam width of the MR response.

Arraying tag antennas for coherent and/or non-coherent operation to increase the range of operation where coherent operation requires phase accurate retro reflection, while non-coherent does not.

Configuring the MR to rotate the polarization angle of the retro reflected pattern to improve contrast.

Configuring the MR to convert the handedness of a circular polarized the retro reflected pattern, for example, converting right handedness to left handedness.

Configuring the MR to convert a linear retro reflected pattern to a circularly polarized retro reflected pattern.

The tag-interrogator system can be used to monitor assets, objects, people, animals, vehicles, inventory, cargo in trains, ships, semi trailers, or the trains, ships, and semi trailers themselves. It can be used indoors or outdoors, in high multipath environments or low multipath environments, and can be useful for through-wall location. It can be used for long range applications such as scenarios where the interrogator and tags are on the ground or where the interrogator(s) is in the air associated with, for example, an aircraft such as a plane, helicopter, or unmanned air vehicle (UAV), and the tag(s) are on the ground (or water) associated with personnel, vehicles, and equipment, tanks, weapons, unmanned ground vehicles, etc. and vice versa. As such, the tag-interrogator system can be used for sports applications, identification of friend vs. foe (IFF), locating lost tagged items (e.g., black boxes, escaped prisoners, escaped pets or farm animals), and locating buried tagged land mines. It can also be used for short range applications such as animal and employee ID systems, emergency responder tracking, swat team member tracking, body instrumentation for virtual reality gaming, and even intra-body biomedical monitoring, In one example application, military personnel, vehicles, and equipment (e.g., rocket launchers) have tags associated with them. The tags are interrogated by interrogators located on the ground (or water) and/or in the air (e.g., a UAV) to provide situational awareness and IFF information for command and control purposes.

In another example application, a helicopter can interrogate a neighborhood to find a lost pet or interrogate an area around a prison to locate an escaped prisoner. Similarly, a plane might interrogate a mountain range or an expanse of water where a plane is believed to have gone down looking for the signature of a black box or perhaps a tag on a life raft or live preserver associated with a survivor of an accident.

In one scenario, cargo containers have a tag associated with them that can be detected by interrogators distributed at places (i.e., locations) about a shipyard, airport, railroad yard, manufacturing facility, storage facility, etc. where they are moved about. Using interrogation results, identification information, and correlated information in databases, the location of the cargo containers can be tracked and monitored as they are processed through a facility or otherwise stored there.

As described previously, tags can also have associated with them various sensors and/or other informational sources allowing them to convey information other than their identity. For example, a tag associated with a cargo box or firefighter might also be interfaced with a temperature sensor, heart monitor, smoke sensor, etc. thereby allowing decisions to be made based upon sensor readings. Similarly, a tag associated with a soldier might interface with one or more sensors intended to detect nuclear, biological, or chemical weapons.

While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention.

What is claimed is:

1. A method for monitoring a person, animal, object, or place, comprising:
    associating a modulating reflector tag with said person, animal, object, or place, said modulating reflector tag including an antenna structure having at least one characteristic modified in accordance with a pattern, said pattern intended to convey information pertaining to said person, animal, object, or place, said modulating reflector tag being located at a first location, said antenna structure employing retro reflector effects to improve signal-to-noise of said modulating reflector tag to enable an increased interrogation range;
    transmitting an interrogation signal towards said modulating reflector tag using an interrogator located at a second location different from said first location, said interrogation signal reflecting off said modulating reflector tag as a return signal, said retro reflector effects causing said return signal to return directly back towards said interrogator regardless of where said interrogator is located relative to said modulating reflector tag;
    receiving said return signal, said receiving occurring at said second location;
    demodulating said received return signal to determine said information; and
    monitoring said person, animal, object, or place based upon said demodulated information.

2. The method of claim 1, further comprising:
    determining a range between said first location and said second location.

3. The method of claim 1, further comprising:
    determining said first location.

4. The method of claim 3, wherein said first location is determined using at least one of a plurality of transmitting locations or a plurality of receiving locations.

5. The method of claim 3, wherein said person comprises one of:
    an emergency responder;
    military personnel;
    a firefighter;
    an employee;
    a soldier;
    a prisoner;
    a swat team member;
    a survivor; and
    a friend.

6. The method of claim 1, wherein said animal comprises one of:
    a pet;
    a farm animal.

7. The method of claim 1, wherein said object comprises one of:
    a vehicle;
    inventory;
    cargo;
    a train;
    a ship;
    a semi trailer;
    an aircraft;
    a plane;
    a helicopter;
    an unmanned air vehicle;
    an unmanned ground vehicle;
    a weapon;
    a tank;
    a rocket launcher;
    equipment;
    a black box;
    a land mine;
    instrumentation for virtual gaming;
    instrumentation for intra-body monitoring;
    a sensor;
    a life raft; and
    a life preserver.

8. The method of claim 1, wherein said place comprises one of:
- a location within a shipyard;
- a location within an airport;
- a location within a railroad yard;
- a location within a manufacturing facility; and
- a location within a storage facility.

9. The method of claim 1, further comprising:
associating said modulating reflector tag with a sensor.

10. The method of claim 1, further comprising:
using said information pertaining to said person, animal, object, or place for at least one of:
- situational awareness;
- identification of friend versus foe; and
- command and control purposes.

11. A system for monitoring a person, animal, object, or place, comprising:
- a modulating reflector tag at a first location, said modulating reflector tag being associated with said person, animal, object, or place, said modulating reflector tag including an antenna structure having at least one characteristic modified in accordance with a pattern, said pattern intended to convey information pertaining to said person, animal, object, or place, said antenna structure employing retro reflector effects to improve signal-to-noise of said modulating reflector tag to enable an increased interrogation range;
- a transmitter at a second location that transmits an interrogation signal towards said modulating reflector tag, said interrogation signal reflecting off said modulating reflector tag as a return signal, said retro reflector effects causing said return signal to return directly back towards said second location regardless of where said transmitter is located relative to said modulating reflector tag; and
- a receiver at said second location that receives and demodulates said received return signal to determine said information, wherein said information can be used to monitor said person, animal, object, or place.

12. The system of claim 11, wherein said transmitter and receiver function as a monostatic radar.

13. The system of claim 11, further comprising:
one or more additional receivers that receive one or more other return signals based upon one or more other interrogation signals.

14. The system of claim 13, wherein the position of said person, animal, object, or place is determined.

15. The system of claim 11, further comprising:
one or more additional transmitters that transmit one or more additional interrogation signals.

16. The system of claim 15, wherein said receiver determines a position of said person, animal, object or place.

17. A modulating reflector tag, comprising:
- an antenna structure, said antenna structure employing retro reflector effects to improve signal-to-noise of said modulating reflector tag to enable an increased interrogation range, said retro reflector effects returning a return signal directly back towards an interrogator regardless of where said interrogator is located relative to said modulating reflector tag; and
- a modulating network, said modulating network modifying at least one characteristic of said antenna structure in accordance with a pattern, said pattern intended to convey information pertaining to a person, animal, object, or place.

* * * * *